United States Patent
Krude

[11] Patent Number: 5,380,249
[45] Date of Patent: Jan. 10, 1995

[54] TRIPOD JOINT

[75] Inventor: Werner Krude, Neunkirchen-Wolperath, Germany

[73] Assignee: GKN Automotive AG, Siegburg, Germany

[21] Appl. No.: 943,338

[22] Filed: Sep. 10, 1992

[30] Foreign Application Priority Data

Sep. 18, 1991 [DE] Germany .................. 4130956

[51] Int. Cl.$^6$ ........................... F16D 3/205
[52] U.S. Cl. ..................... 464/111; 464/123; 464/905
[58] Field of Search ............. 464/111, 120, 122–124, 464/132, 905

[56] References Cited

U.S. PATENT DOCUMENTS

| | | | |
|---|---|---|---|
| 3,975,922 | 8/1976 | Orain | 464/123 |
| 5,209,700 | 5/1993 | Bensinger et al. | 464/111 |

FOREIGN PATENT DOCUMENTS 0297298  1/1989  European Pat. Off. .

Primary Examiner—Daniel P. Stodola
Attorney, Agent, or Firm—Harness, Dickey & Pierce

[57] ABSTRACT

A tripod joint has an outer joint part with three circumferentially distributed, axis-parallel recesses which form circumferentially opposed tracks. An inner joint part with a star-shaped cross-section and three circumferentially distributed arms engaging the recesses in the outer joint part is associated with the outer part. The arms support roller assemblies. Each roller assembly has at least one inner ring and an outer roller. The inner ring is angularly movable relative to the arm and axially movable relative to the arm axis. A rolling contact bearing is arranged between an outer surface of the inner ring and an inner surface of the outer roller. Also, the outer surface of the outer roller rolls directly on the tracks. The inner ring and outer roller, with reference to the joint axis, are each supported radially outwardly independently of one another. Also, the inner ring and outer roller, with reference to the joint axis, are radially inwardly supported independently of one another directly on a securing element. The securing element, with reference to the joint axis, is radially inwardly supported on guiding edges of the recesses.

24 Claims, 16 Drawing Sheets

11''  17''

11''''

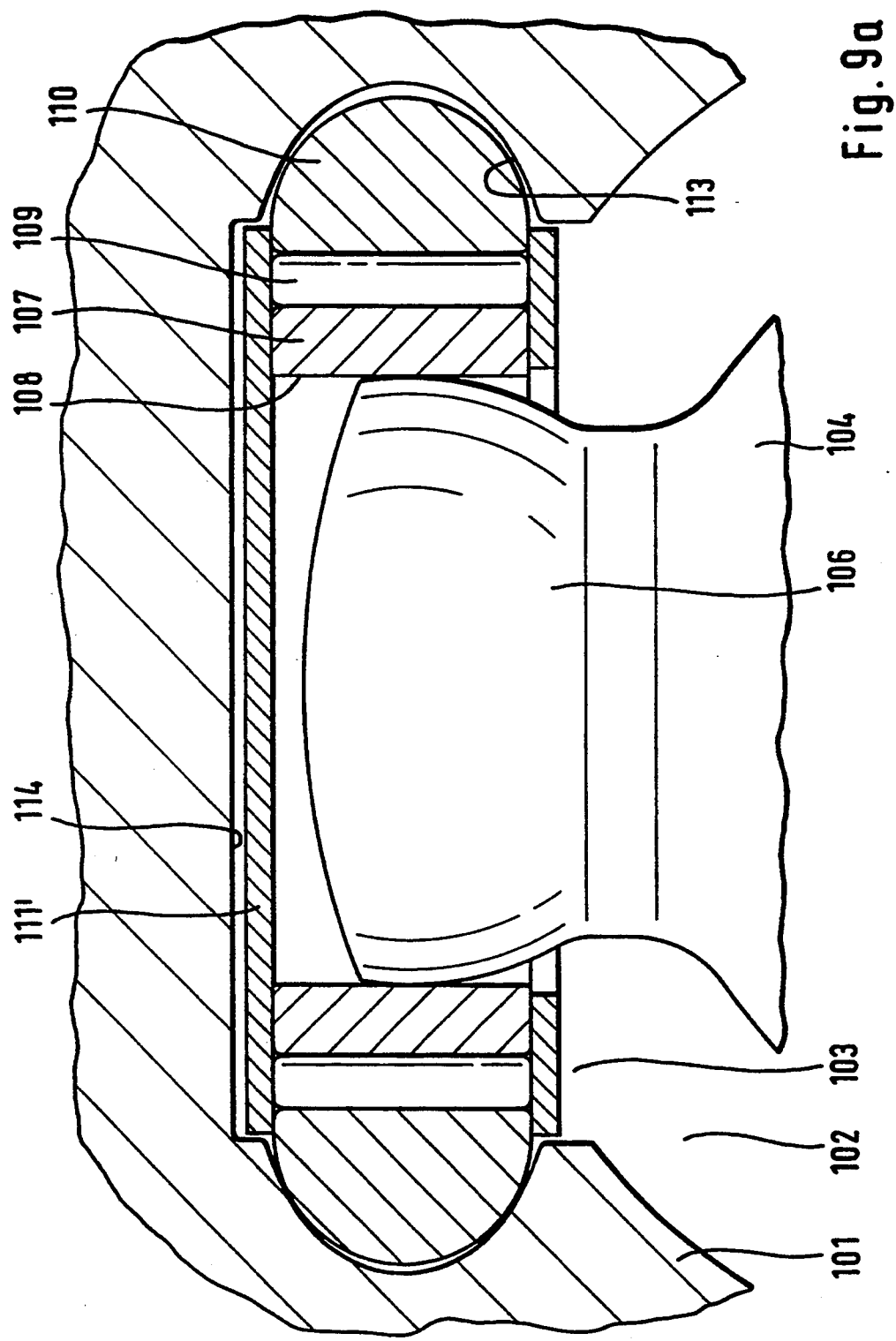

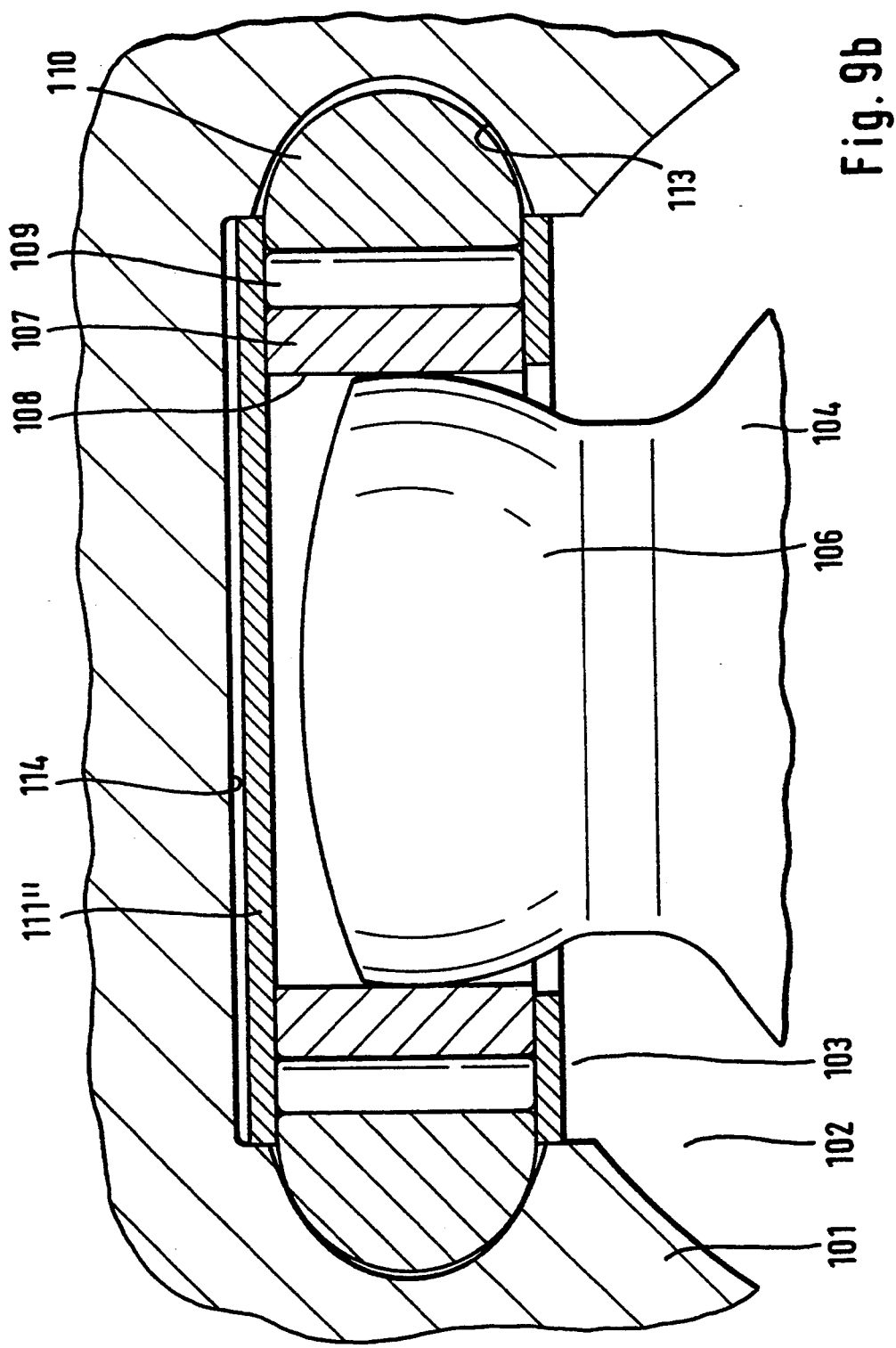

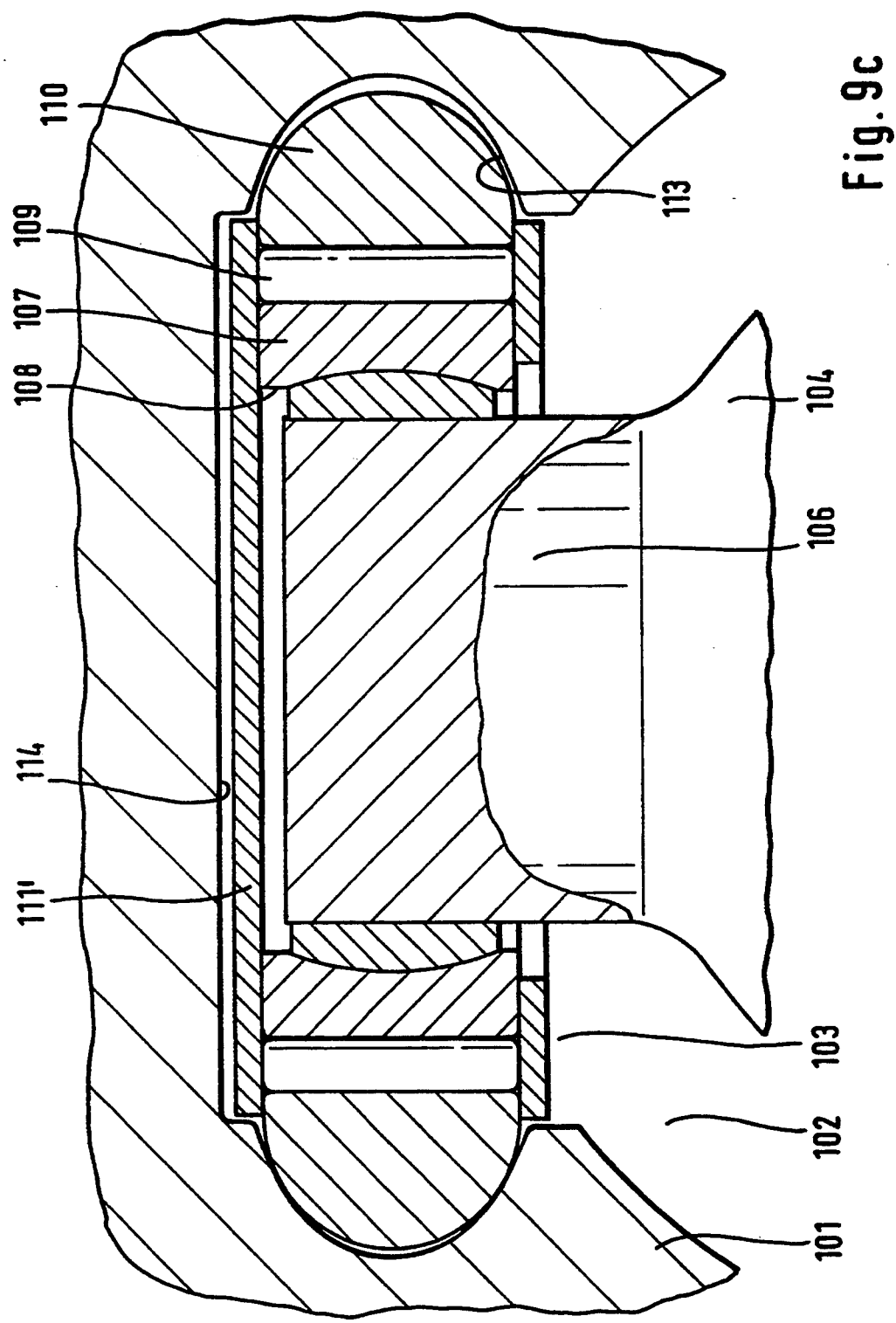

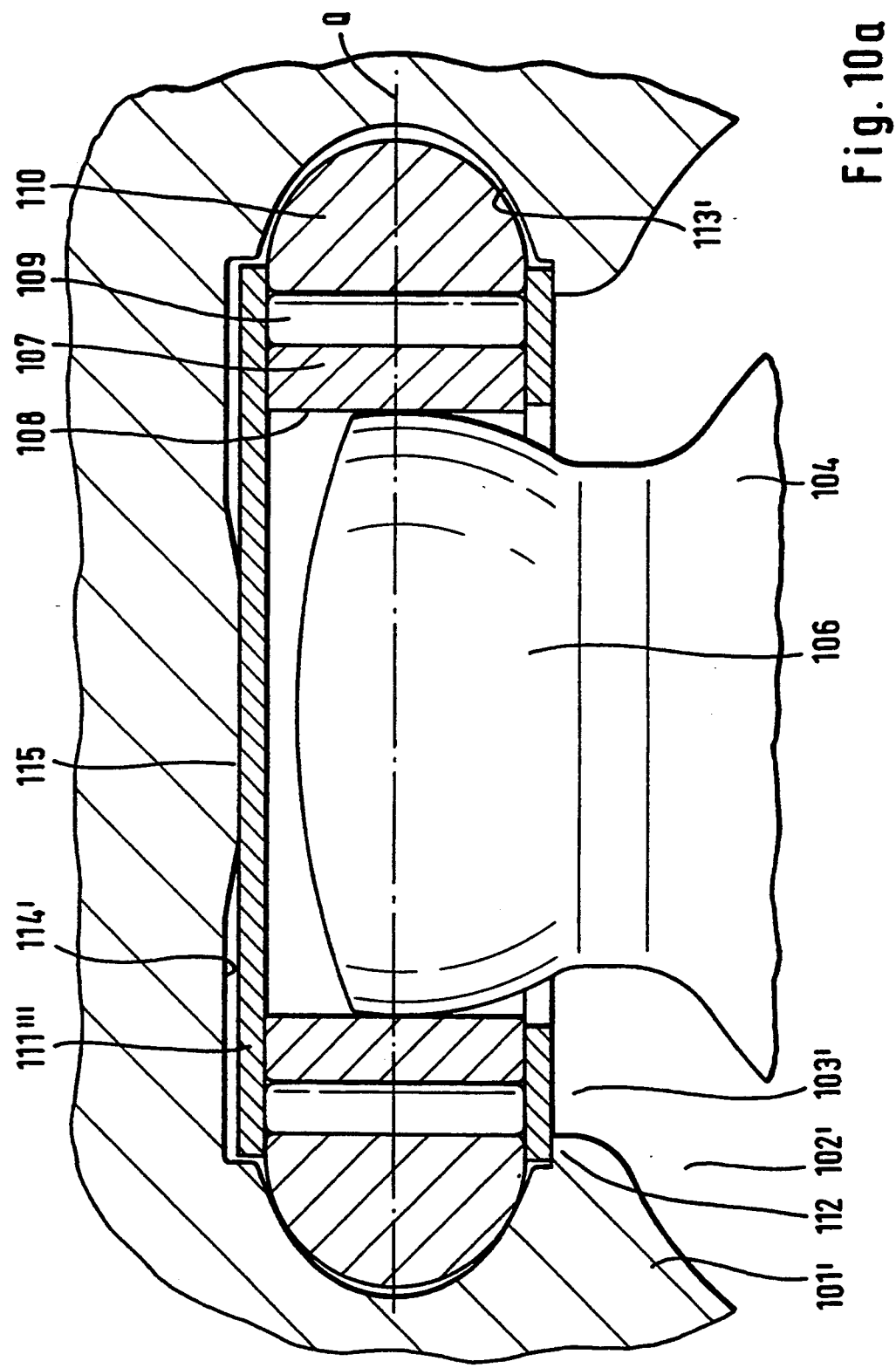

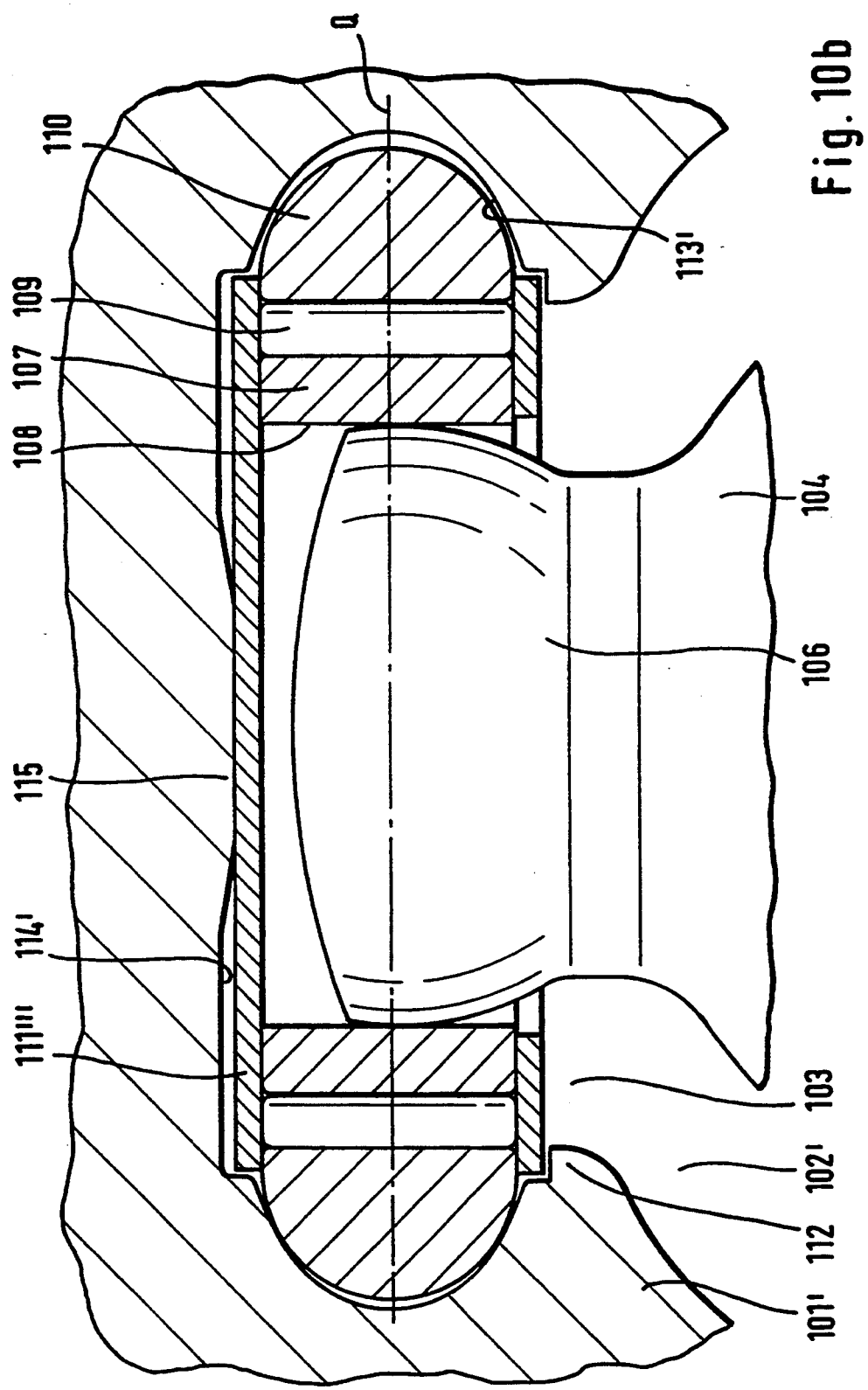

101  113  111'  118   116   106 107 109 110 117

101  113  111"  118   116   106 107 109 110 117

TRIPOD JOINT

BACKGROUND OF THE INVENTION

The present invention relates to a tripod joint. The tripod joint has an outer joint part with three circumferentially distributed, axis-parallel recesses forming circumferentially opposed tracks. An inner joint part with a star-shaped cross-section and three circumferentially distributed arms engages the recesses in the outer joint part. The arms support roller assemblies. Each roller assembly has at least one inner ring and an outer roller. The inner ring is angularly movable relative to the arm and axially movable relative to the arm axis. A rolling contact bearing is between the outer surface of the inner ring and the inner surface of the outer roller with the outer surface of the outer roller rolling directly on the tracks.

With conventional tripod joints, the tripod rollers, with reference to the arm axis, are axially movable and rotatably arranged on their tripod arms. In consequence, with a joint rotating in the articulated condition, the roller axis oscillatingly moves out of its originally perpendicular position relative to the axis of the outer joint part. This movement occurs every time the joint rotates between two end positions which, in each case, correspond to the joint articulation angle. In the process, the movement of the roller surface on the outer roller relative to the track in the outer joint part subjected to loads during the introduction of torque, in addition to the rolling component as a result of the articulation angle, has a sliding component which leads to vibration excitations out of the joint.

These disadvantages have already been overcome in the case of joints of the type where the roller axis is permanently held in a perpendicular position relative to the longitudinal axis of the outer joint part. Here, the rollers carry out purely oscillating rolling movements when the joint rotates in the articulated condition. The sliding movement takes place entirely between the respective tripod arm and a non-rotating, possibly multi-component, inner ring.

In order to ensure that the angularly constant position of the roller assembly is maintained with reference to the outer joint part and with the orientation of its longitudinal axis remaining unchanged, it is necessary to provide special supporting faces for the roller assembly in the outer joint part. JP 2 135 719 U illustrates this type of joint. In this disclosure, the inner ring of a roller assembly, with reference to its axis, is provided with a radially enlarged collar. The collar, with reference to the joint axis, rests against guiding edges of the tracks in the outer joint part. When viewed radially, the collar is substantially rectangular thereby preventing the inner ring from rotating around the arm axis on the one hand and the roller assembly from tilting with reference to the axis of the outer joint part on the other hand. The disadvantages of this design refer to the complicated design of the inner ring and the multi-component design of the roller assembly.

SUMMARY OF THE INVENTION

It is therefore an object of the present invention to provide a joint of the initially mentioned type with a simplified design, but, at the same time retains its functional advantages. The invention may be applied to joints of the type as described in EP 90 12 09 83.3 on the one hand and to joints of the type as referred to in JP 2 135 719 U on the other hand.

A first solution has the inner ring and the outer roller each supported on a further part, directly and radially outwardly with reference to the joint axis. Also, the inner ring and outer roller are supported on a planar securing element directly and radially inwardly with reference to the joint axis. The securing element is supported on guiding edges of the recess radially inwardly with reference to the joint axis. Outward support is preferably provided at least indirectly by the base of the recess.

In this way, the rolling contact bearing assembly is simplified considerably. The parts to be axially secured relative to each other are supported at least radially inwardly directly on a planar securing element. Thus, there is no need for the inner ring and outer roller to be axially secured relative to each other. Further, the invention may eliminate the groove normally required in the annular surfaces facing each other.

In a first embodiment, the parts are supported radially outwardly directly on the planar base of the recesses. According to a further embodiment, it is possible to provide a second, substantially planar securing element which directly radially outwardly supports the inner ring, possibly the rolling members and outer roller and which, in turn, is directly supported on the planar base of the recesses. The securing elements may be centered and secured relative to the roller assembly by a concentric engaging member provided on the securing element relative to the non-rotating inner ring. The parts may be held together by a press-fit. Preferably, the parts of the roller assembly, with reference to the joint axis, are independently radially movable relative to the securing elements.

In a preferred embodiment, the simply designed and independently operating securing elements may have a substantially rectangular shape in a radial view. The contact regions relative to the tracks in the outer joint part are restricted to axial end portions or individual double arch regions, with a central drawn-in region therebetween. In this way, it is possible to reduce friction. With reference to the arm axis, as a result of enlarged lever arms, the friction forces are reduced which occur at the securing elements.

A second solution provides the inner ring, possibly the rolling members and the outer rollers each in contact, directly and radially outwardly and radially inwardly with reference to the joint axis, with a securing element having two planar interconnected plate metal parts. Also, with reference to their rotational axes, the inner ring, possibly the rolling member and the outer rollers are axially secured relative to each other by the securing element.

In this case, the bearing assembly design is greatly simplified. The simplification is due to the way in which the inner ring, rolling members and outer rollers are axially secured relative to each other via one single component. Also, the annular faces on the inner ring and outer roller, which face each other, may be designed groove-free or substantially cylindrically smooth.

According to a first embodiment, outward and inward radial support with reference to the outer joint part may be provided directly via the interconnected inner and outer plate metal parts of the securing elements. Possibly, the parts may not require centering relative to the roller assembly since it is possible to provide a simple clamping fit relative to the inner ring. However, it is also possible to center them at least once relative to the inner ring on one of the two interconnected plate metal parts of the securing elements.

Again, the securing elements, with reference to the outer joint part, may be directly supported radially by resting against the planar base or the recesses and on the respective guiding edges of the recesses.

However, according to a further embodiment it is also possible for the outer rollers to engage the tracks in a form-fitting way. The engagement provides radial support whereas the securing elements, at most, are supported against rotation around the roller axes via suitable guiding edges on the tracks. In this case, guiding edges are provided on at least one of the two guiding elements as already described above with reference to the first solution. Here, the guiding edges may be restricted to axial end regions or double arch regions to reduce the friction forces. It is also possible to provide the bases of the recesses with axially extending guiding webs. The webs support the securing elements relative to tilting movement of the roller assemblies around axes extending perpendicularly relative to the joint axis, whereas the form-fitting engagement of the rollers in the tracks supports the roller assemblies against tilting movements around axes extending parallel to the joint axis.

A third solution has the inner ring and the outer roller, with reference to the joint axis and independently of each other, directly supported radially inwardly on a first planar securing element. The inner ring, the outer roller and the first securing element are held together by a further securing element including two planar interconnected plate metal parts. While mutually supporting one another, the further securing elements are connected to one another, at least indirectly, at one of their axial ends by an axis-normally positioned central plate.

The design of the roller assembly is simplified since mutual support of the inner ring, possibly the rolling members and the outer roller is ensured by the planar securing element together with the one additional securing element including two plate metal parts. The radially inner securing elements are provided with a centering mechanisms relative to the inner ring or outer rollers. The inner and outer plate metal parts of the further securing elements have such a large area that the displacement of the roller assembly relative to these elements, occurring during articulation, does not adversely affect the radial securing function. The inner tongue-shaped plate metal part of the first securing element is provided with a joint recess in which the respective tripod arm moves in an axially oscillating way when the joint rotates in an articulated condition. The radial forces may be supported by the further securing elements directly on the planar bases of the recesses. However, it is also possible for the outer rollers to engage the tracks of the recess in a form-fitting way. In this case, the further securing element is provided with radial play relative to the tracks so that the radial forces and tilting forces are accommodated by the form-fitting engagement between the roller and tracks. The plate metal parts of the further securing element, depending on the design, may be connected to one another either directly on the radially outer or on the radially inner portions.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention will be explained below with reference to the drawings wherein

FIG. 6a is an enlarged partially in cross-section view of FIG. 1 along line 6a-6a.

FIG. 6b is a modified view like FIG. 6a.

FIG. 9a is an enlarged view of a detail according to FIGS. 7 and 8.

FIG. 9b is an enlarged view of a detail according to FIGS. 7 and 8.

FIG. 9c is a view like FIG. 9a of an additional embodiment of the present invention;

FIG. 10a shows a detail of a joint similar to that shown in FIGS. 7 and 8 in a modified form.

FIG. 10b is an enlarged view of a modified joint similar to that shown in FIGS. 7 and 8.

FIG. 11a is a partial cross-section view of FIG. 9a along line 11a-11a.

FIG. 11c is a modified view like that of FIG. 11a.

DETAILED DESCRIPTION OF THE PREFERRED EMBODIMENTS

Figure 1:
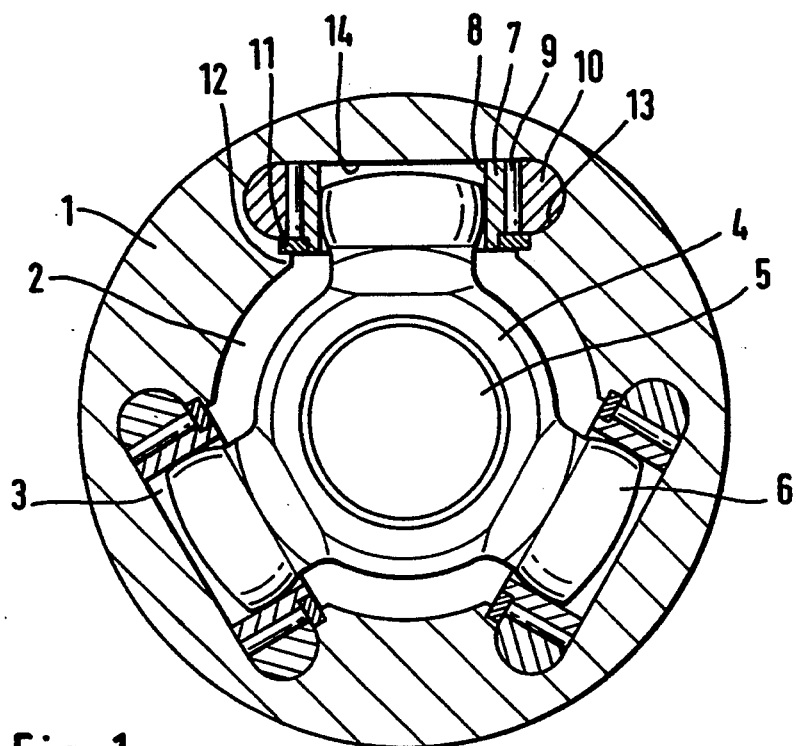
FIG. 1 is a cross-section of a first embodiment of a joint in accordance with the present invention.

FIGS. 1 to 5 illustrate details which correspond to each other and whose reference numerals differ by 20. The reference numbers in FIGS. 6a to 6c correspond to those used in FIG. 1.

The figures show an outer joint part 1, 21, 41, 61, 81 with a central opening 2, 22, 42, 62, 82 and three circumferentially distributed recesses 3, 23, 43, 63, 83. An inner joint part 4, 24, 44, 64, 84 with a central aperture 5, 25, 45, 65, 85 to receive a shaft journal, not shown, and with three uniformly circumferentially distributed tripod arms 6, 26, 46, 66, 86 is introduced into the outer joint part. The tripod arms 6, 26, 46, 66, 86, at their ends, have a spherical head each carrying a roller assembly.

An inner ring 7, 27, 47, 67, 87 is directly on the spherical head of the tripod arms 6, 26, 46, 66, 86. The inner ring 7, 27, 47, 67, 87 includes an internally cylindrical surface 8, 28, 48, 68, 88 which, relative to the respective tripod arm, is arranged for pivotable and radial movement. An outer roller 10, 30, 50, 70, 90 is rotatably supported relative to the inner ring 7, 27, 47, 67, 87 via a needle bearing 9, 29, 49, 69, 89. At least the inner ring 7, 27, 47, 67, 87 and the needle bearing 9, 29, 49, 69, 89, with reference to the joint axis, are radially inwardly supported by a securing element 11, 31, 51, 71, 91 which, in turn, is supported on guiding edges 12, 32, 52, 72, 92 in the respective outer joint part recess 3, 23, 43, 63, 83. Also, the inner ring 7, 27, 47, 67, 87, with reference to the joint axis, is supported radially outwardly directly on the base of the outer joint part recess 3, 23, 43, 63, 83. The outer roller is provided with play relative to the securing element 11, 31, 51, 71, 91 and is directly radially supported in tracks 13, 33, 53, 73, 93 in the outer joint part 1, 21, 41, 61, 81.

Figure 2:
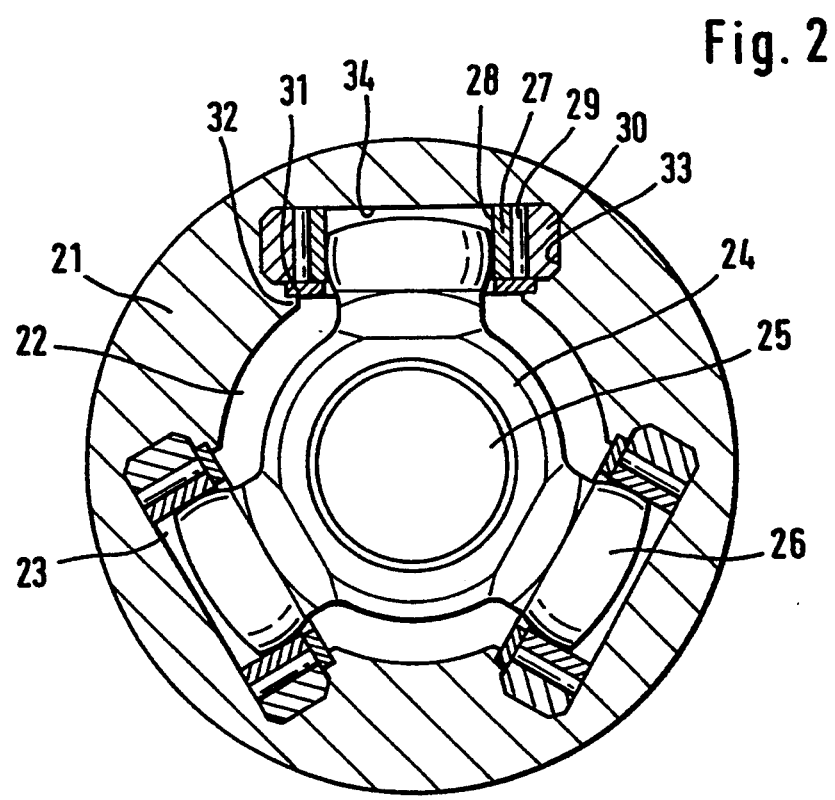
FIG. 2 is a cross-section of a second embodiment of a joint in accordance with the present invention.

In FIGS. 1 and 2, the inner ring 7, 27 and the needle bearings 9, 29, with reference to the joint axis, are directly radially outwardly supported on the planar base 14, 34 of the respective recess 3, 23. Also, the outer roller may be directly radially outwardly supported on the base, however, it is preferable to radially support it on its tracks 13, 33 in the recess 3, 23.

Figure 3:
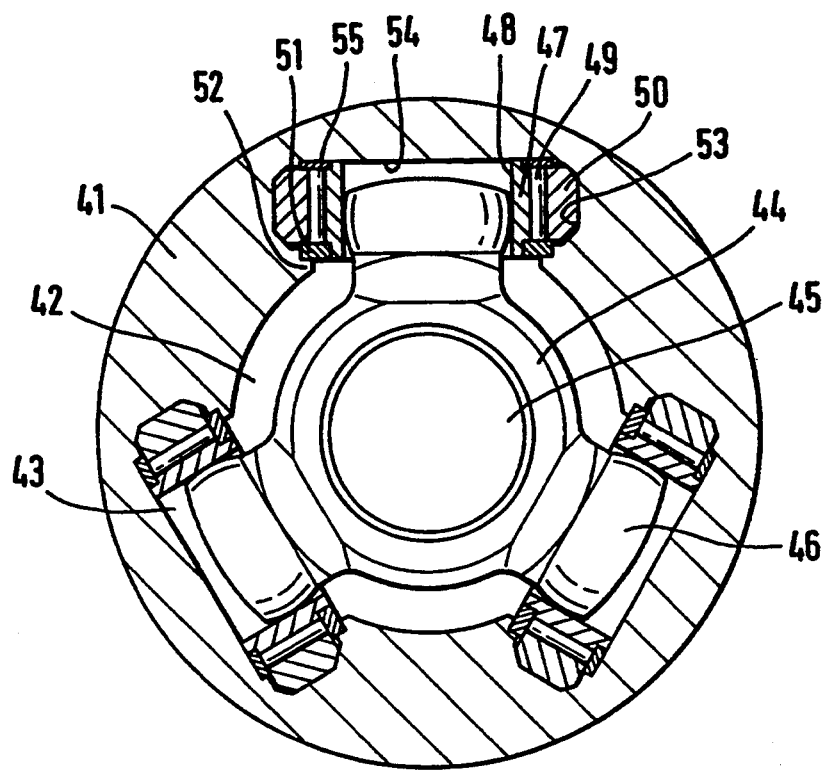
FIG. 3 is a cross-section of a third embodiment of a joint in accordance with the present invention.
Figure 4:
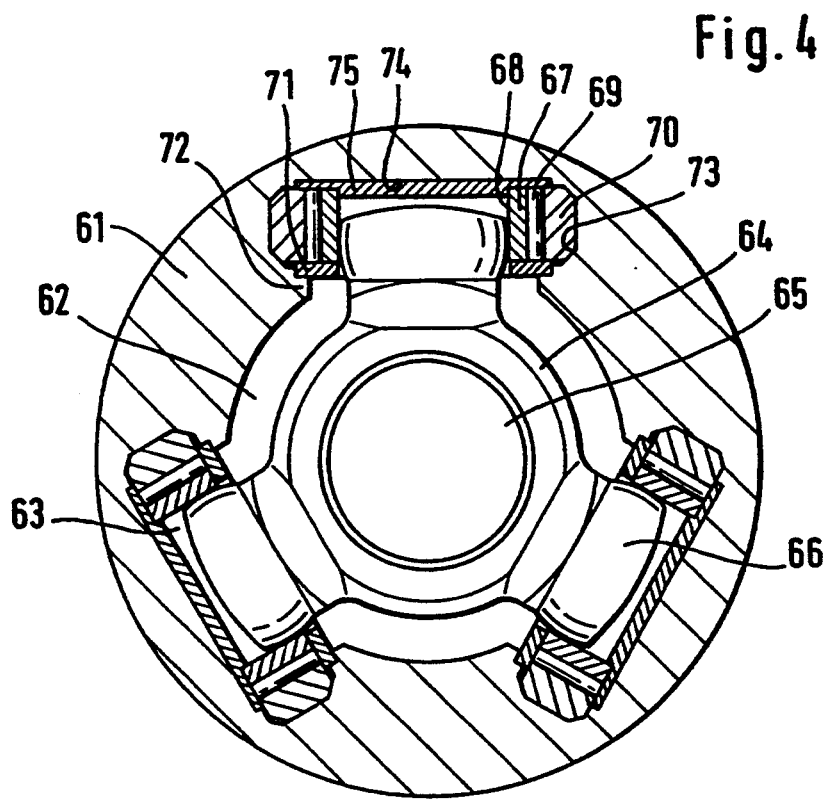
FIG. 4 is a cross-section of a fourth embodiment of a joint in accordance with the invention.
Figure 5:
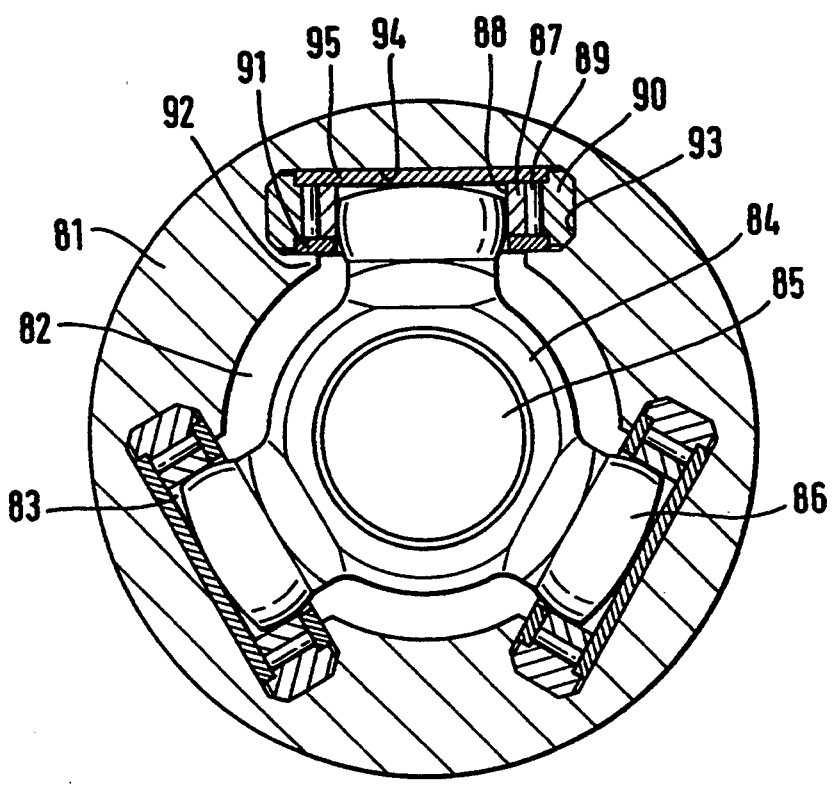
FIG. 5 is a cross-section of a fifth embodiment of a joint in accordance with the present invention.

In FIGS. 3 to 5, the inner ring 47, 67, 87 and the needle bearing 49, 69, 89, with reference to the joint axis, are radially outwardly supported on a further securing element 55, 75, 95. In FIG. 3, the securing element 55 is designed as an annular ring. In FIGS. 4 and 5, the securing elements 75, 95 are designed as a disc. In FIGS. 3 through 5, the outer roller 50, 70, 90 may be radially supported on the securing element 55, 75, 95 or, preferably, directly in its tracks 53, 73, 93.

In FIG. 1, the outer rollers include an outer surface which, in the longitudinal section through the roller, has a semi-circular shape. In FIGS. 2 to 5, the outer surface of the roller is substantially cylindrical. According to FIGS. 1 and 3, the inner securing elements 11, 51 are centered on a step on the inner ring 7, 47. In FIGS. 2 and 4, the securement elements 37, 72 are centered in the outer joint part recesses 23, 63. In FIG. 5 the inner securement element 92 is centered in the outer roller 90.

Figure 6A:
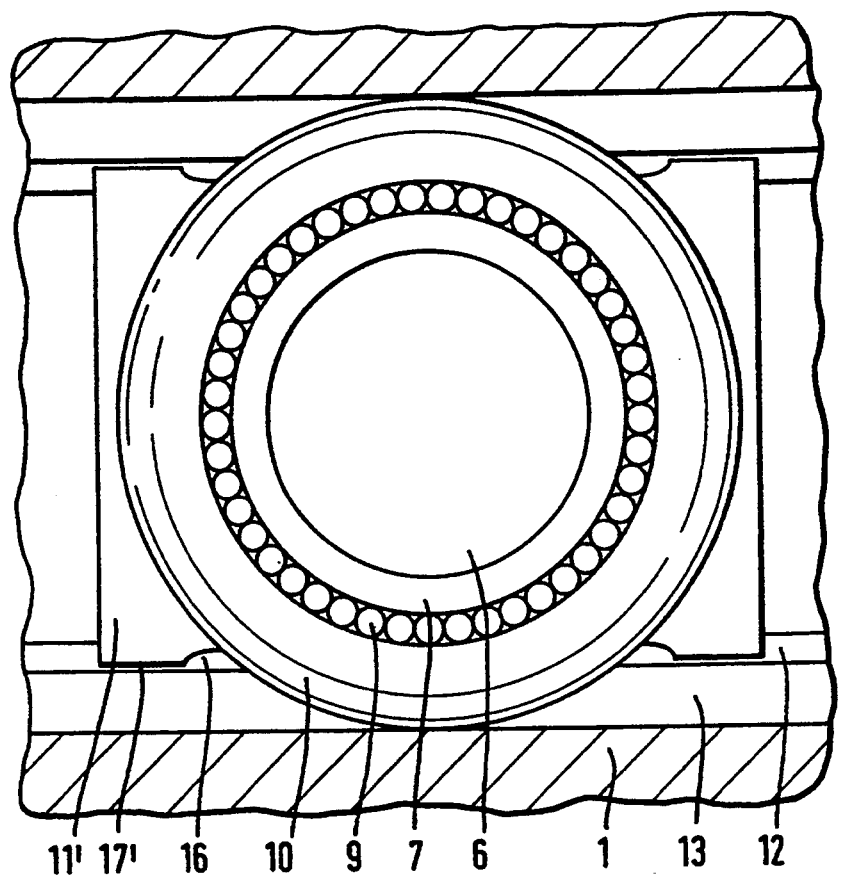
Figure 6B:
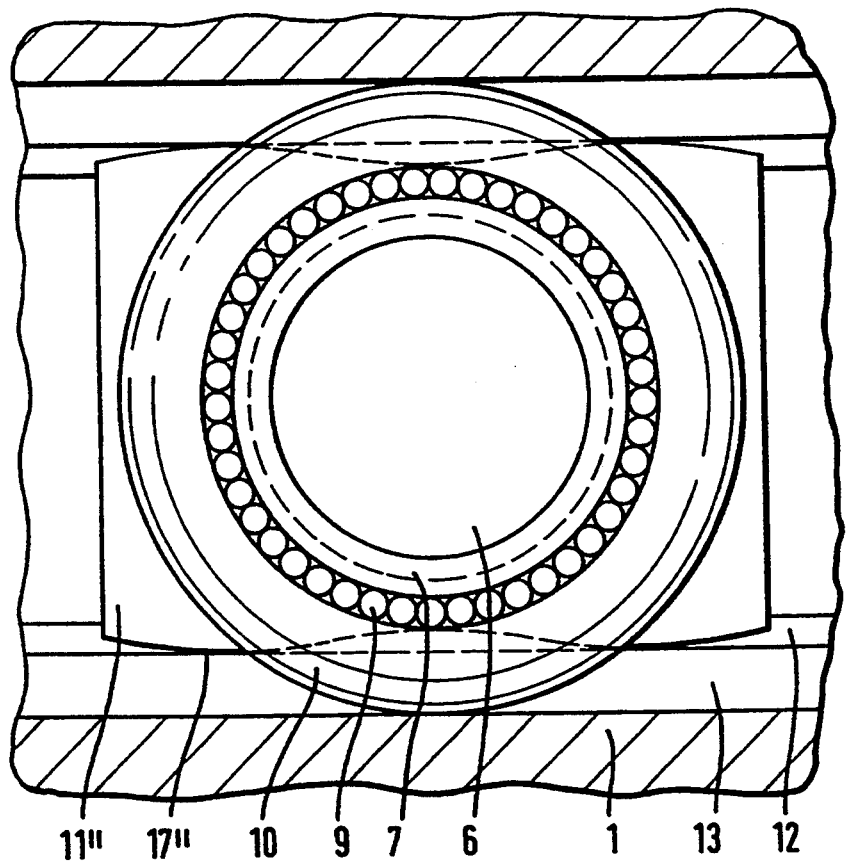

FIGS. 6a and 6b, in a radial view, show the outer joint part 1 with the tracks 13 and a tripod arm 6 with a complete roller assembly, i.e. with the inner ring 7, the needle bearing 9 and the outer roller 10.

In FIG. 6a, underneath the roller assembly, there is shown a securing element 11' which is substantially rectangular in shape, which may be centered on the inner ring 7, for example (FIG. 1 and 3), and which is radially supported on the guiding edges 12 of the recess 3. Along the longitudinal edges recesses 16 are formed to enable the axial ends or guiding regions 17' to provide support against rotation relative to the tracks. Friction is reduced as a result of this configuration.

Figure 6C:
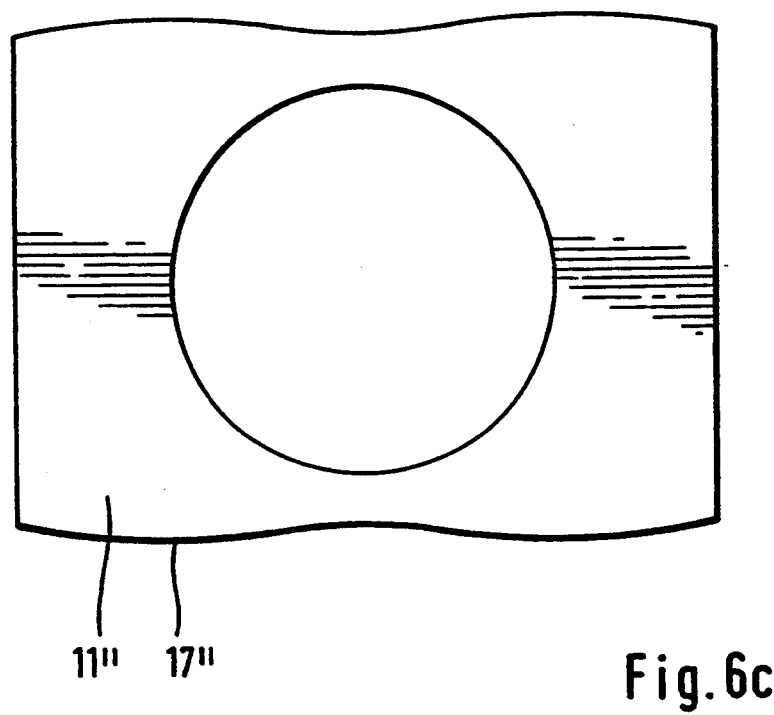
FIG. 6c is a plan view of a plate of FIG. 6b.
Figure 6D:
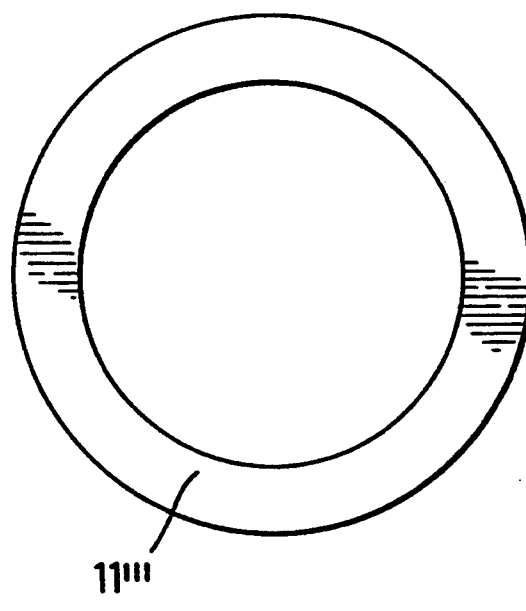
FIG. 6d is a plan view of a modified plate like FIG. 6c.

In FIG. 6b, underneath the roller assembly, there is shown a securing element 11" which, in the circumferential direction, is centered on the guiding edges 12 (FIGS. 2 and 4) and is radially supported thereon. Double arches are along the longitudinal edges to provide guiding areas to support against rotation relative to the tracks. This configuration reduces friction. FIG. 6c is a plan detail of element 11". FIG. 6d is a securing element 11''' which may be centered in the outer roller as seen in FIG. 5.

In FIGS. 7 to 11, the reference numerals which correspond to one another differ by 20. The reference numerals in FIGS. 9 to 11 correspond to those used in FIG. 7.

The figures show an outer joint part 101, 121 with central openings 102, 122 and three circumferentially distributed recesses 103, 123. An inner joint part 104, 124 with a central plug-in aperture 105, 125 to receive a shaft journal and with three uniformly circumferentially distributed tripod arms 106, 126 is introduced into the outer part. The tripods arms 106, 126, at their ends, are designed to be spherical and carry a roller assembly.

The roller assembly includes an inner ring 107, 127 directly on the spherical tripod arms 106, 126. The inner ring 107, 127 has an internally cylindrical surface 108, 128. The inner ring 107, 127, with reference to its respective tripod arm, is pivotable and radially movable. An outer roller 110, 130 is rotatably supported relative to the inner ring 107, 127 via a needle bearing 109, 129. In the radial direction, the inner ring 107, 127, the needle bearing 109, 129 and the outer roller 110, 130 are held relative to each other in two planes by an interconnected securing element 111, 131. The outer rollers 110, 130, with reference to the joint axis, are supported directly in its tracks 113, 133 in the outer joint part 101, 121.

Figure 7:
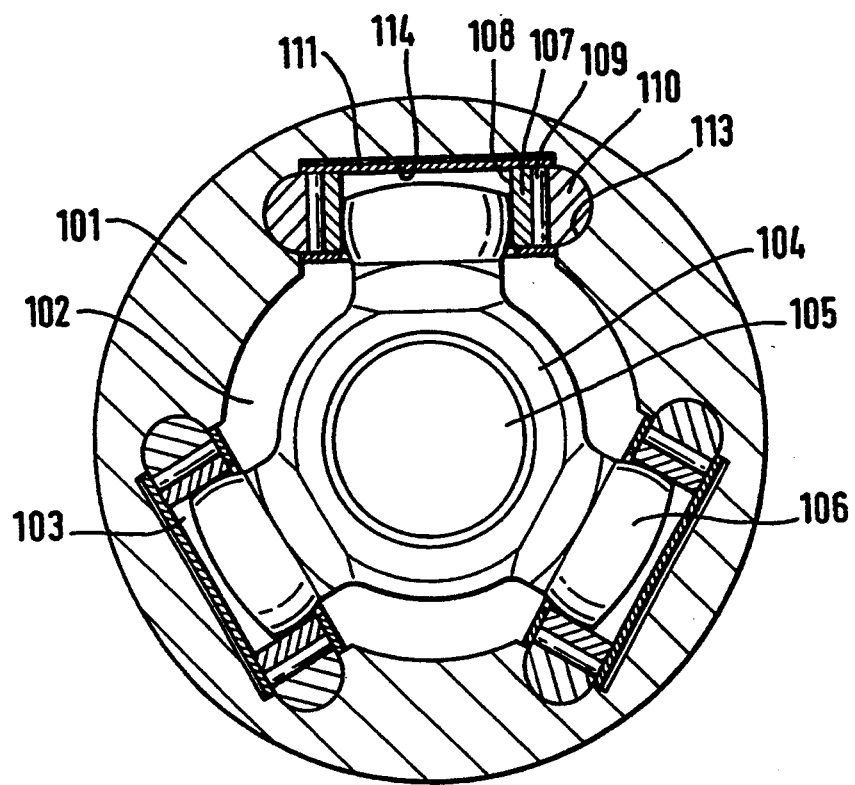
FIG. 7 is a cross-section view of another embodiment of a joint in accordance with the present invention.
Figure 8:
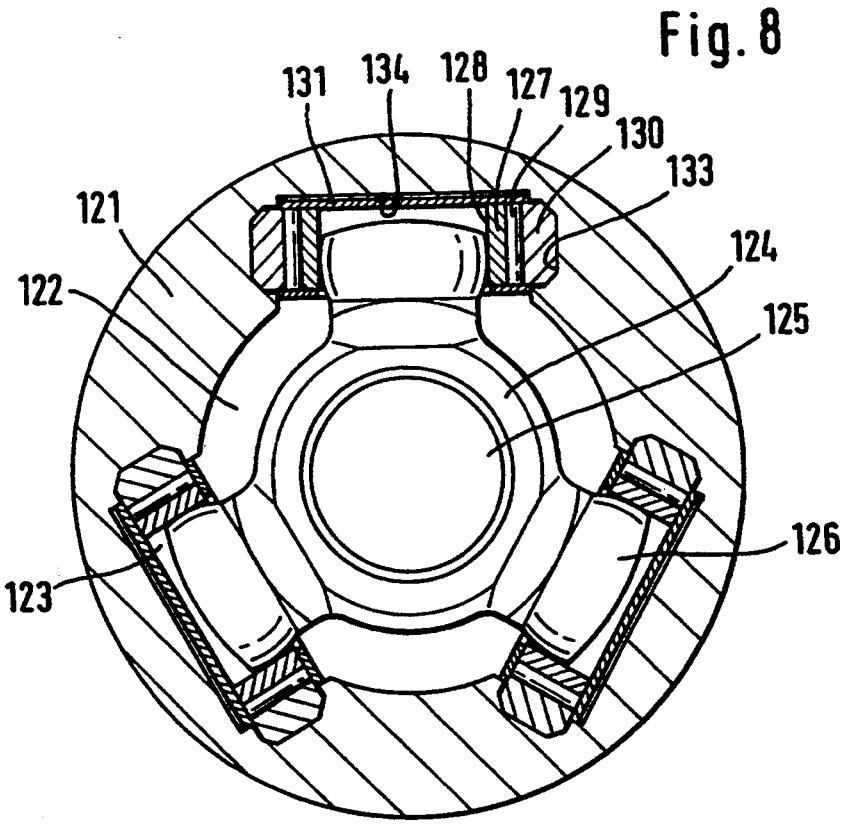
FIG. 8 is a cross-section view like FIG. 7 of another embodiment of a joint in accordance with the present invention.

In FIG. 7, the outer rollers have an outer surface which, in the longitudinal section through the roller, has a semi-circular shape. In FIG. 8, the outer surface of the rollers is substantially cylindrical.

In FIGS. 9a and 9b, each showing a roller assembly in the form of a detail according to FIG. 7, the securing element 111', 111" is radially free relative to the base 114 of the recess 103. Thus, radial support of the roller assemblies is provided only via the outer surface of the outer roller 110 in its tracks 113 of the recess 103. In FIG. 9a, the securing element 111' is provided with circumferential play relative to the recesses. In FIG. 9b, the securing element 111" is guided without circumferential play in the recesses.

FIG. 9c is a view similar to FIG. 9a, however, an intermediate ring 119 is shown, having an internally cylindrical inner surface and an externally spherical outer surface. The arms are cylindrical and engage the internally cylindrical inner surface of the intermediate ring with an external internal cylindrical surface. The inner surface of the inner ring is designed to be at least partially internally spherical and able to receive the respective intermediate ring with the externally spherical surface in an angular movable way.

In FIGS. 10a and 10b, the modified base 114' of the track is provided with a longitudinally extending guiding rail 115 to support the securing element 111'. Thus, the roller assembly is supported in its entirety relative to tilting moments around the transverse axis Q. Any tilting moments around the axis which extends parallel to the joint axis and perpendicularly to the plane of the figure are accommodated by the outer surface of the outer roller 110 in tracks 113. Guiding edges 112 are provided underneath the inner part of the securing element to support the securing element 111'. In FIG. 10a the securing element is supported radially inwardly in a play-free way. In FIG. 10b where the securing element 111' is provided with greater play relative to the guiding edge, the outer roller 110 is radially supported relative to the tracks 113.

Figure 11A:
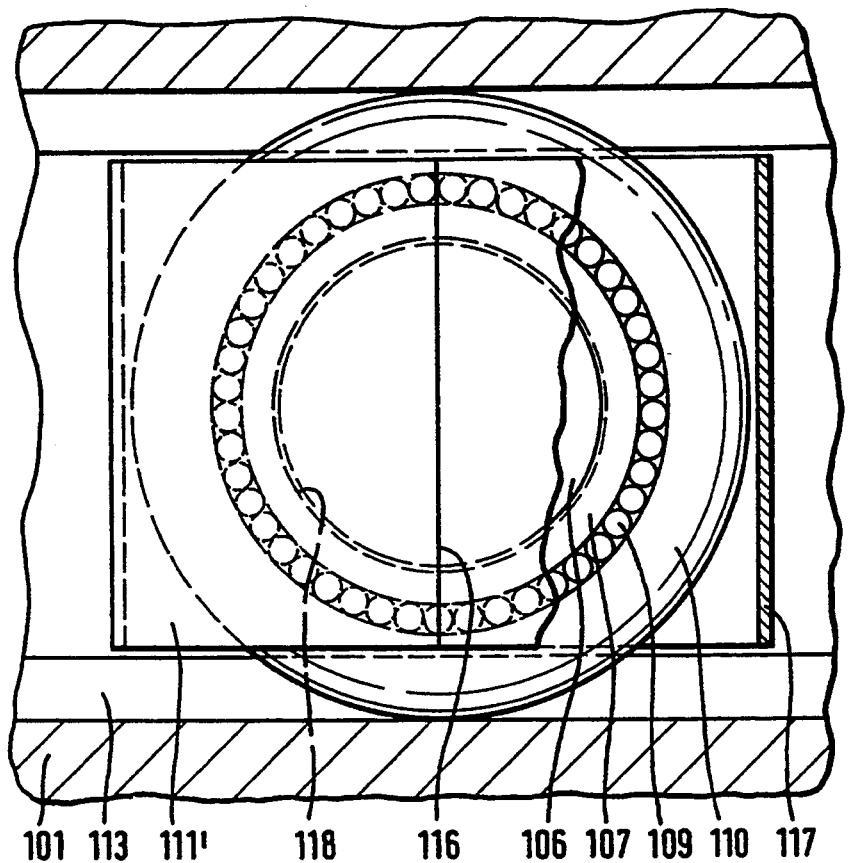
Figure 11B:
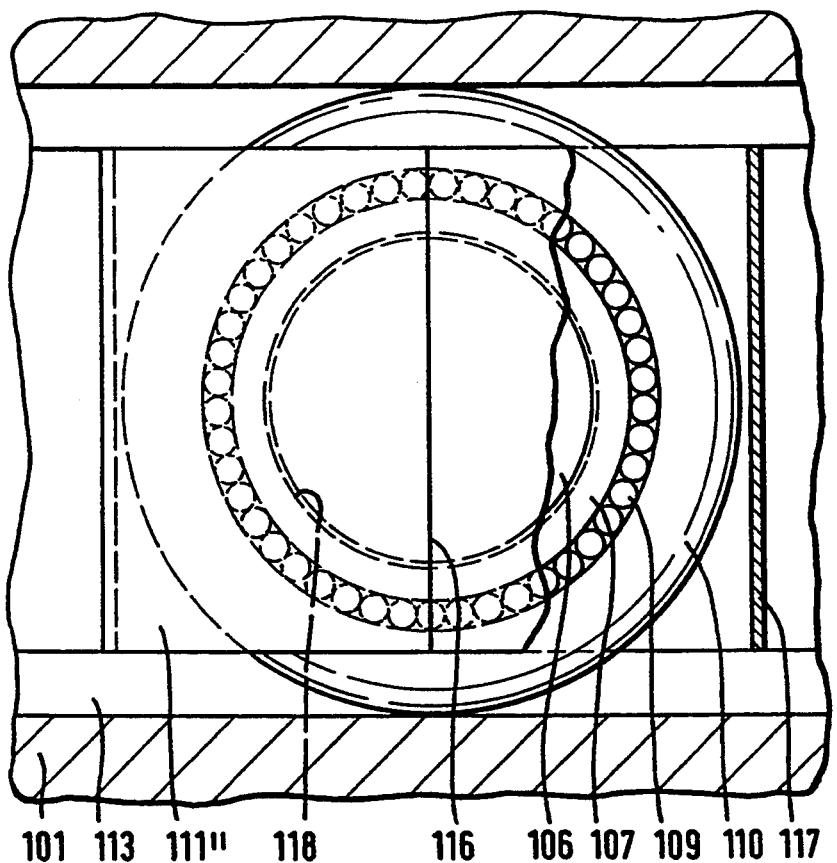
FIG. 11b is a partial cross-section view of FIG. 9b along line 11b-11b.
Figure 11C:
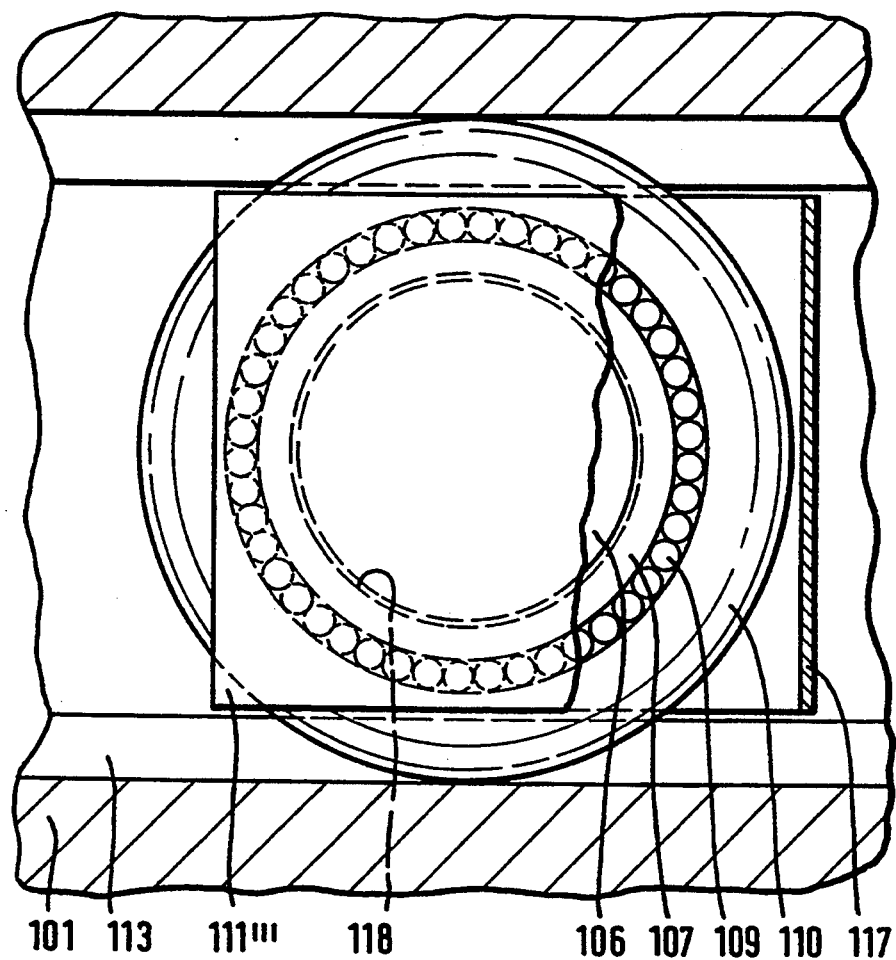
Figure 12:
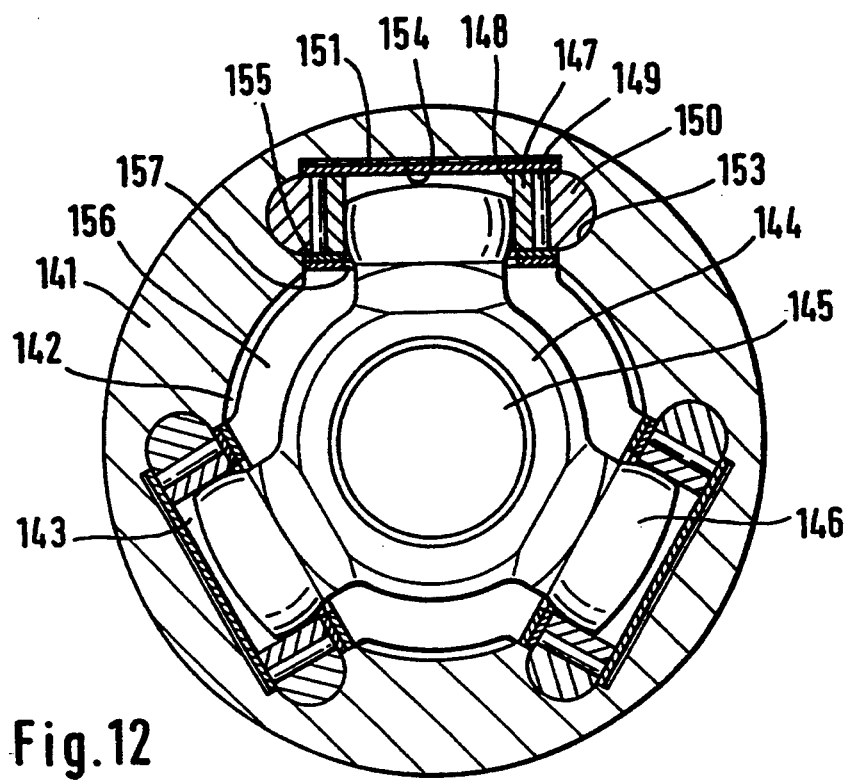
FIG. 12 is a cross-section view of another embodiment of a joint in accordance with the present invention.
Figure 13:
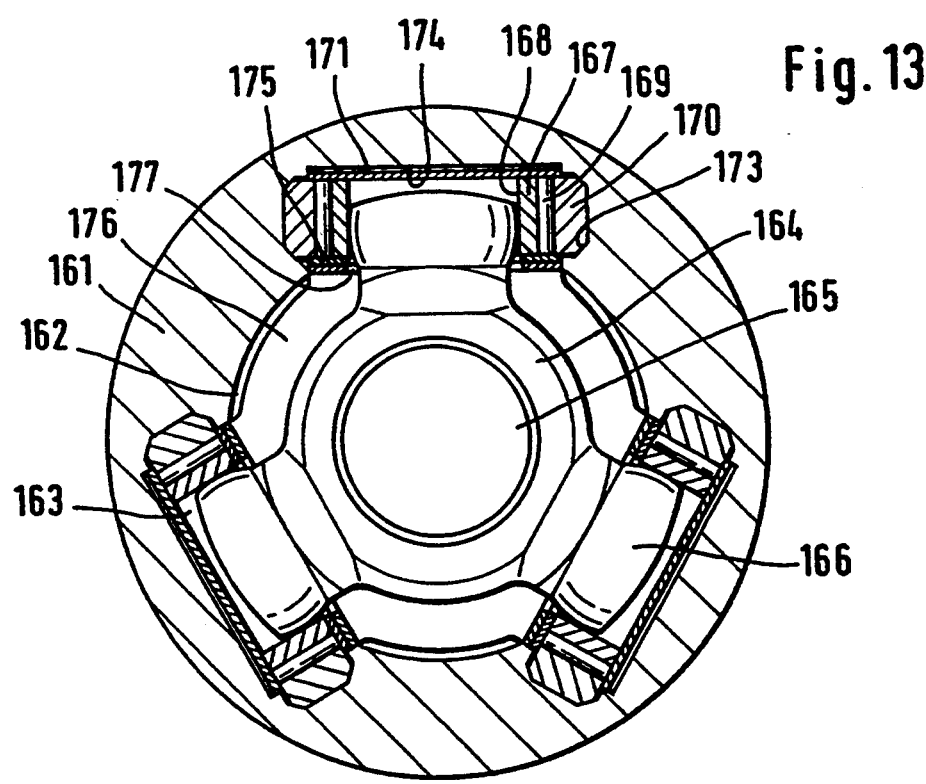
FIG. 13 is a cross-section view like FIG. 12 of another embodiment of a joint in accordance with the present invention.

FIGS. 11a to 11c illustrate details to FIGS. 9a and 9b. The figures show the outer joint part 101 with the tracks 113, and a tripod arm 106 guides the inner ring 107 of the roller assembly, the needle bearing 109 and the outer roller 110, which are held together by the securing element 111. FIGS. 11a and 11b show the securing element in a section extending perpendicularly to the plane of the Figure, with an open box profile with an inner central aperture 118, two connecting webs 117 and a radially outer butt joint 116.

FIG. 11c shows the same view as illustrated in FIGS. 11a to 11b. The securing element, in section, has a U-profile which is open on one side and extends perpendicularly relative to the plane of the figure. On the radial inside, the securement element has a central aperture 118, but only one connecting web 117 on one side.

In FIGS. 11a and 11c, the securing elements are provided with circumferential play according to FIG. 9a, whereas in FIG. 11b, the securing element is guided without any circumferential play, as shown in FIG. 9b.

In FIGS. 12 to 15, the reference numerals of corresponding details differ by 20. The reference numbers in FIGS. 14 and 15 correspond to those used in FIG. 12.

The figures show an outer joint part 141, 161 with a central opening 142, 162 and three circumferentially distributed recesses 143, 163. An inner joint part 144, 164 with a central aperture 145, 165 to receive a shaft journal and with three uniformly circumferentially distributed tripod arms 146, 166 is introduced into said outer part. The tripod arms 146, 166, at their ends, are designed to be spherical and carry a roller assembly.

The roller assembly includes an inner ring directly on the spherical tripod arm 146, 166. The inner ring has an internally cylindrical surface 148, 168. The inner ring, relative to the respective tripod arm, is pivotable and radially movable. An outer roller 150, 170 is rotatably supported relative to the inner ring 147, 167 via needle bearings 149, 169. The roller assemblies are held together by securing elements 151, 171 whose longitudinal section is U-shaped.

Figure 14:
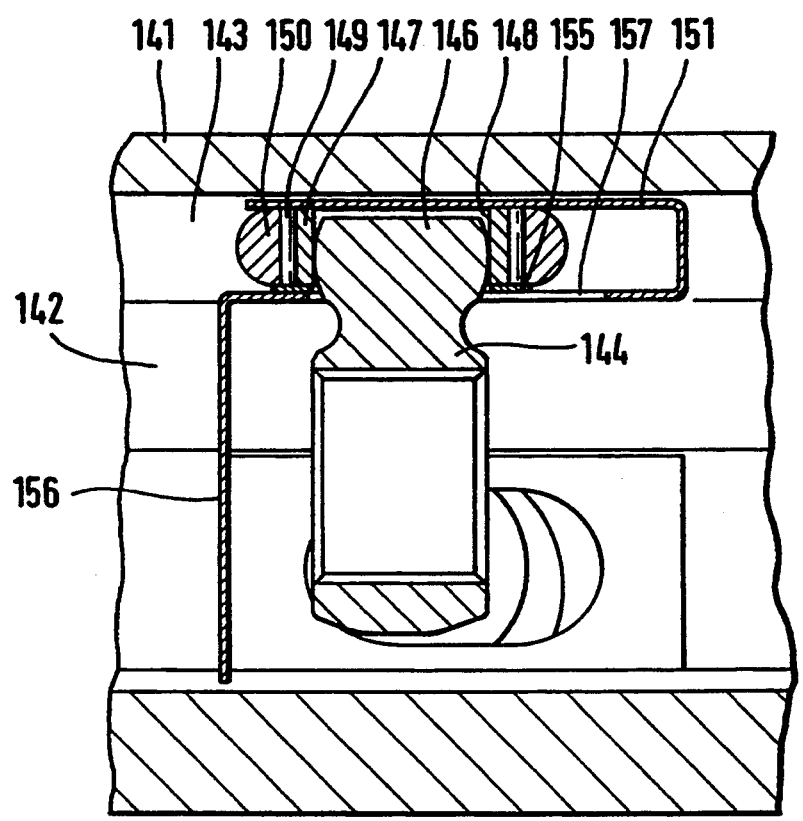
FIG. 14 is a longitudinal cross-section view of FIG. 12.
Figure 15B:
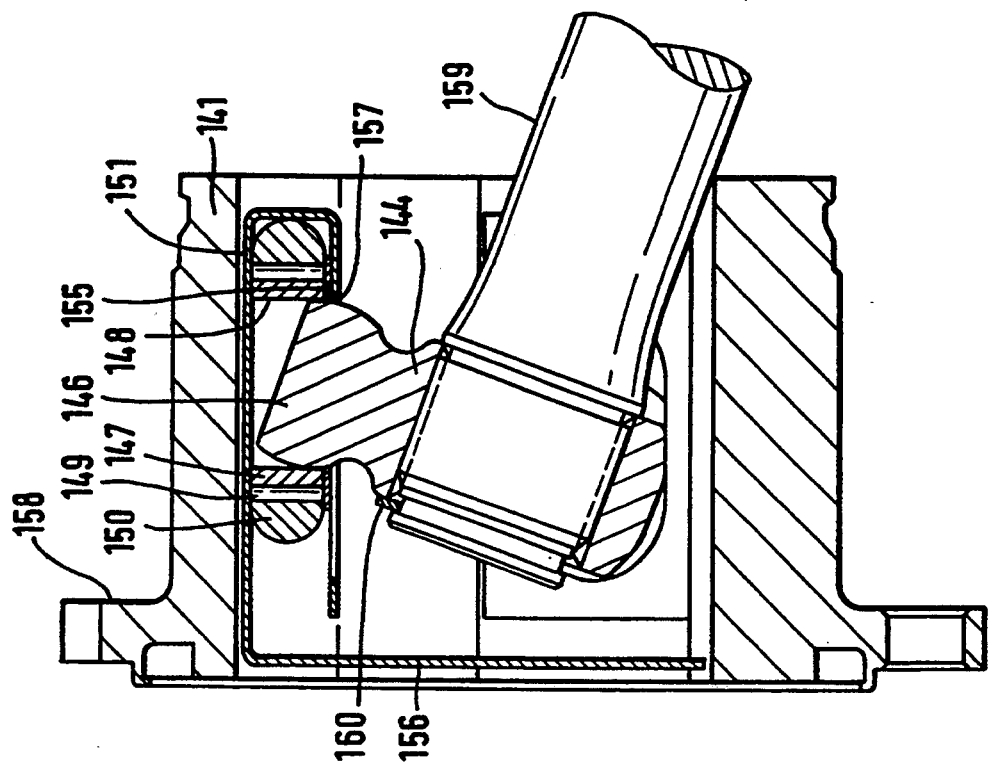
FIG. 15b is a view like FIG. 15a in an articulated condition.

Supporting discs 155, 175 are positioned directly between the radially inner part of the securing elements 151, 171 and the respective roller assembly. As can be seen in FIGS. 14 and 15, the securing elements 151, 171 are connected to one another via a central plate 156, 176. The inner part of the securing element includes an oblong hole 157, 177 to enable an angular movement, as shown in FIG. 15b. The supporting disc 155, 175 which slides inside the securing element 151, 171, only includes a through-aperture whose diameter approximately corresponds to that of the tripod arm. The supporting disc may be centered relative to the inner ring 147, 167 or the outer roller 150, 170.

Figure 15A:
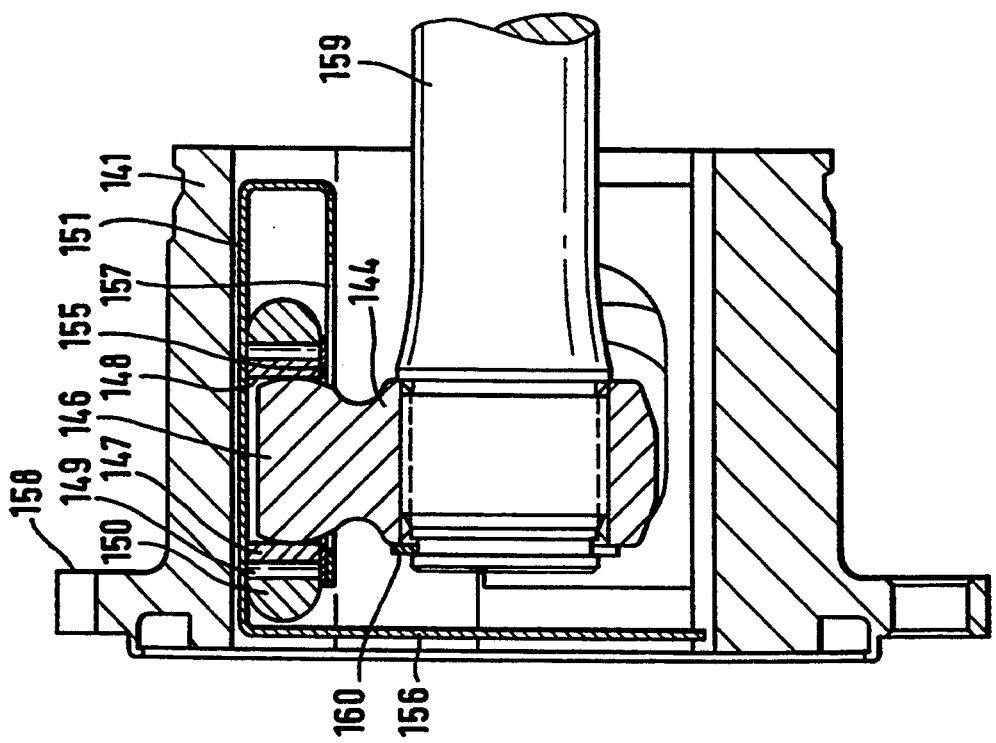
FIG. 15a is a modified longitudinal cross-section of the joint of FIG. 12.

FIGS. 15a and 15b show the outer joint part 141 in its entirety, with a flange 158 and a shaft 159 inserted into the inner joint part 144 and secured by a securing ring 160.

While the above detailed description describes the preferred embodiment of the present invention, the invention is susceptible to modification, variation, and alteration without deviating from the scope and fair meaning of the subjoined claims.

I claim:

1. A tripod joint comprising:
   an outer joint part including three circumferentially distributed, axis-parallel recesses forming circumferentially opposed tracks, said recesses including a planar base;
   an inner joint member having a star-shaped cross-section having three circumferentially distributed arms engaging the recesses in the outer joint part;
   roller assemblies supported on each arm, each roller assembly including an least one inner ring and an outer roller, said inner ring being angularly movable relative to said arm and axially movable relative to the arm axis, said inner ring and outer roller each being in direct contact with and each being supported directly on the planar base of said cracks;
   a rolling contact bearing being arranged between an outer surface of the inner ring and an inner surface of the outer roller and an outer surface of the outer roller rolling directly on said outer joint part tracks;
   means for directly and radially outwardly with reference to the joint axis supporting the inner ring and outer roller; and
   a securing element directly and radially inwardly, with reference to the joint axis, supporting said inner ring and outer roller, said securing element supported radially inwardly, with reference to the joint axis, on guiding edges of said recesses.

2. A tripod joint according to claim 1, wherein at least the outer surface of the inner ring and at least the inner surface of the outer roller are cylindrical.

3. A tripod joint according to claim 1, wherein the arms are each provided with a spherical head directly engaging an internally cylindrical inner surface of the inner ring.

4. A tripod joint comprising:
   an outer joint part including three circumferentially distributed, axis-parallel recesses forming circumferentially opposed tracks; a base of said recesses includes a planar base;
   an inner joint member having a star-shaped cross-section having three circumferentially distributed arms engaging the recesses in the outer joint part;
   roller assemblies supported on each arm, each roller assembly including at least one inner ring and an outer roller, said inner ring being angularly movable relative to said arm and axially movable relative to the arm axis;
   a rolling contact bearing being arranged between an outer surface of the inner ring and an inner surface of the outer roller and an outer surface of the outer roller rolling directly on said outer joint part tracks;
   means for directly and radially outwardly with reference to the joint axis supporting the inner ring and the outer roller;
   a first securing element directly and radially inwardly, with reference to the joint axis, supporting said inner ring and outer roller, said securing element supported radially inwardly, with reference to the joint axis, on guiding edges of said recesses; and
   a second securing element rests against the base of the recesses, and said inner ring and outer roller are directly supported on said second supporting element.

5. A tripod joint according to claim 4, wherein in radial view of the outer joint part, that at least one of the first arid second securing elements are at least partially substantially rectangular on their radial inside and their radial outside.

6. A tripod joint according to claim 5, wherein at least on their radial inside, that at least one of the first and second securing elements, at their longitudinal edges facing the tracks, include central drawn-in regions and, at their axial ends facing the recesses include guiding edge portions for contacting with the tracks.

7. A tripod joint according to claim 6, wherein the securing elements include central drawn in regions on their radial outside.

8. A tripod joint according to claim 3, wherein the arms are cylindrical and engage an internally cylindrical inner surface of an intermediate ring with an externally cylindrical surface and that the inner surface of the inner wing is at least partially internally spherical and able to receive the respective intermediate ring in an angularly movable way.

9. A tripod joint comprising:
an outer joint part with three circumferentially distributed, axis-parallel recesses forming circumferentially opposed tracks;
an inner joint member having a star-shaped cross-section having three circumferentially distributed arms engaging the recesses of the outer joint part;
roller assemblies supported on said arms, each including at least one inner ring and an outer roller, with the inner ring being angularly movable relative to the arm and axially movable relative to the arm axis;
a rolling contact bearing being arranged between an outer surface of the inner ring and an inner surface of the outer roller and outer surface of the outer roller rolling directly on the tracks;
a securing element in contact directly and radially outwardly and radially inwardly, with reference to the joint axis, with the inner ring and the outer roller, and, with reference to their rotational axes, axially secured relative to each other by said securing element, said securing element including two planar interconnected plate metal parts.

10. A tripod joint according to claim 9, wherein said securing element is supported, at least radially outwardly, directly on a base of the recesses and said outer roller being guided with radial play in said tracks.

11. A tripod joint according to claim 10, wherein said securing element is supported radially inwardly on guiding edges of the recesses in the outer joint part.

12. A tripod joint according to claim 9, wherein said securing element is kept contact-free in the outer joint part on its radial outside and its radial inside and said outer roller is supported radially outwardly and radially inwardly in said tracks in the outer joint part.

13. A tripod joint according to claim 9, wherein at least the outer surface of the inner ring and at least the inner surface of the outer roller are groove-free.

14. A tripod joint according to claim 9, wherein in a radial view of the outer joint part, that at least one of the first and second securing elements, at lease on their radial inside, are substantially rectangular.

15. A tripod joint according to claim 14, wherein at least on their radial inside, securing elements, at their longitudinal edges facing the tracks, are provided with central drawn-in portions and guiding edge portions for making contact with the tracks.

16. A tripod joint according to claim 15, wherein on their radial outside, the securing elements, at their longitudinal edges facing the tracks, are provided with central drawn in portions and guiding edge portions for making contact with the tracks.

17. A tripod joint according to claim 14, wherein the securing elements on their radial outside are substantially rectangular.

18. A tripod joint according to claim 9, wherein the arms are cylindrical and engage an internally cylindrical inner surface of an intermediate ring with an externally cylindrical surface and the inner surface of the inner ring is at least partially internally spherical and able to receive the respective intermediate ring in an angularly movable way.

19. A tripod joint according to claim 9, wherein in a longitudinal section through the joint, the radially inner and radially outer plate metal parts of the securing element, at least at one of their axial ends, are integrally connected to one another in a U-shaped way by a connecting web.

20. A tripod joint according to claim 9, wherein in the longitudinal section through the joint, the inner radially inner and radially outer plate metal parts of the securing element, at their axial ends, are integrally connected to one another via connecting webs, with a butt joint positioned perpendicularly relative to the longitudinal section extending in one of the plate metal parts or in one of the connecting webs.

21. A tripod joint according to claim 9, wherein the arms are each provided with a spherical head directly engaging an internally cylindrical inner surface of the inner ring°

22. A tripod joint comprising:
an outer joint part with three circumferentially distributed, axis-parallel recesses forming circumferentially opposed tracks;
an inner joint part having a star-shape cross-section having three circumferentially distributed arms engaging the recesses of the outer joint part;
roller assemblies supported on the arms each including at least one inner ring and an outer roller, with the inner ring angularly movable relative to the arm and axially movable relative to the arm axis;
a rolling contact bearing being arranged between an outer surface of the inner ring and an inner surface of the outer roller and the outer surface of the outer roller rolling directly on the tracks;
a first securing element, with reference to the joint axis, directly supporting radially inwardly the inner ring and the outer roller;
a second securing element holding together said inner ring, the outer roller and the first securing element, said second securing element including two interconnected plate metal parts being connected to one another at least indirectly at one of their axial ends by an axis-normally positioned central plate, while mutually supporting one another.

23. A tripod joint according to claim 22, wherein said two interconnected plate metal parts include three radially inner tongue-shaped plate metal parts each provided with an axially extending oblong hole.

24. A tripod joint according to claim 22, wherein said first securing element is substantially centered relative to the roller assemblies and radially inwardly supported by the second securing element.

* * * * *

UNITED STATES PATENT AND TRADEMARK OFFICE
CERTIFICATE OF CORRECTION

PATENT NO. : 5,380,249
DATED : January 10, 1995
INVENTOR(S) : Werner Krude

It is certified that error appears in the above-indentified patent and that said Letters Patent is hereby corrected as shown below:

Column 8, line 7, Claim 1, "an" should be --at--

Column 8, line 14, Claim 1, "cracks" should be --tracks--

Column 8, line 21, Claim 1, after "and" insert --the--

Column 8, line 68, Claim 5, "arid" should be --and--

Column 9, line 16, Claim 8, "wing" should be --ring--

Column 9, line 61, Claim 14, "lease" should be --least--

Column 10, line 33 Claim 21, "ring°" should be --ring.--

Signed and Sealed this

Nineteenth Day of September, 1995

Attest:

BRUCE LEHMAN

Attesting Officer

Commissioner of Patents and Trademarks